United States Patent
O'Loughlin et al.

[19]

[11] Patent Number: 6,142,516
[45] Date of Patent: Nov. 7, 2000

[54] AIR BAG INFLATOR ASSEMBLY

[75] Inventors: John P. O'Loughlin, Gilbert, Ariz.; James M. Rose, Sparks, Nev.; Keven D. Thomas, Mesa, Ariz.

[73] Assignee: TRW Inc., Lyndhurst, Ohio

[21] Appl. No.: 09/150,185

[22] Filed: Sep. 10, 1998

[51] Int. Cl.$^7$ .................................................. B60R 21/30
[52] U.S. Cl. ........................................ 280/738; 280/737
[58] Field of Search .................................. 280/736, 737, 280/740, 742, 738

[56] References Cited

U.S. PATENT DOCUMENTS

| | | |
|---|---|---|
| 3,632,133 | 1/1972 | Hass . |
| 3,708,181 | 1/1973 | Mazelsky ................................. 280/740 |
| 3,791,669 | 2/1974 | Hamilton . |
| 3,807,755 | 4/1974 | Mason, Jr. ............................... 280/736 |
| 3,910,595 | 10/1975 | Katter et al. ............................ 280/738 |
| 5,129,674 | 7/1992 | Levosinski . |
| 5,226,670 | 7/1993 | Wright et al. . |
| 5,433,476 | 7/1995 | Materna et al. ........................ 280/736 |
| 5,464,247 | 11/1995 | Rizzi et al. ............................. 280/737 |
| 5,509,686 | 4/1996 | Shepherd et al. . |
| 5,586,783 | 12/1996 | Adam et al. ........................... 280/737 |
| 5,772,238 | 6/1998 | Breed et al. . |
| 5,782,486 | 7/1998 | Barnes et al. .......................... 280/737 |
| 5,829,783 | 11/1998 | Ishikawa et al. ....................... 280/736 |

*Primary Examiner*—Paul N. Dickson
*Attorney, Agent, or Firm*—Tarolli, Sundheim, Covell, Tummino & Szabo, L.L.P.

[57] ABSTRACT

An apparatus (10) for inflating an inflatable vehicle occupant protection device (40) includes a housing (12) and a container (50) mounted in the housing. A quantity of helium gas (52) is stored under pressure in the container (50). The apparatus (10) includes means (58) for opening the container (50) to enable flow of helium gas (52) out of the container into the housing (12). The housing (12) has wall portions (14, 16, 18, 20) for directing helium gas (52) flowing from the container (50) through an outlet (26) of the housing into the inflatable device (40) to inflate the inflatable device. The housing (12) has at least one aspiration opening (30, 32) for aspirating ambient air into the housing due to the flow of helium gas (52) to mix with the helium gas during flow of helium gas from the container (50) into the inflatable device (40). Preferably, the apparatus (10) includes a converging-diverging nozzle (70) which is connected with the container (50) and through which gas (52) flows from the container prior to mixing with ambient air in the housing (12).

14 Claims, 3 Drawing Sheets

AIR BAG INFLATOR ASSEMBLY

Background Of The Invention

The present invention relates to an inflator assembly, and particularly relates to a stored gas inflator which uses helium to inflate a vehicle occupant protection device, such as an air bag, to help protect an occupant of a vehicle.

SUMMARY OF THE INVENTION

The present invention is an apparatus for inflating an inflatable vehicle occupant protection device and includes a housing and a container mounted in the housing. A quantity of helium gas is stored under pressure in the container. The apparatus includes means for opening the container to enable flow of helium gas out of the container into the housing. The housing has wall portions for directing helium gas flowing from the container through an outlet of the housing into the inflatable device to inflate the inflatable device. The housing has at least one aspiration opening for aspirating ambient air into the housing due to the flow of helium gas to mix with the helium gas during flow of helium gas from the container into the inflatable device. The apparatus includes a converging-diverging nozzle which is connected with the container and through which gas flows from the container prior to mixing with ambient air in the housing.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein.

DESCRIPTION OF PREFERRED EMBODIMENTS

Figure 1:
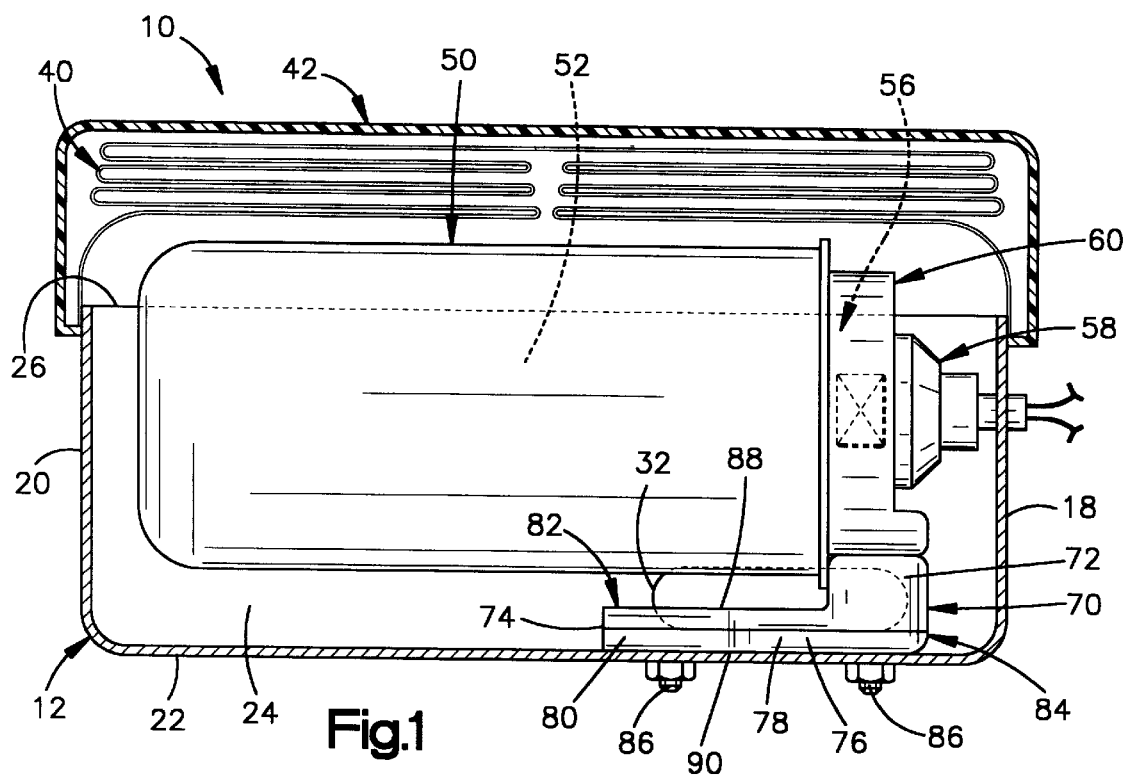
FIG. 1 is a side view, partially in section, of an air bag module including an air bag inflator assembly in accordance with a first embodiment of the present invention.

The present invention relates to an inflator assembly, and particularly relates an inflator assembly including a stored gas inflator which uses helium to inflate a vehicle occupant protection device, such as an air bag. As representative of the present invention, FIG. 1 illustrates an air bag inflator assembly or air bag module 10 for helping to protect a passenger of a vehicle.

The module 10 includes a housing 12 which is mounted to a portion of the vehicle such as the vehicle instrument panel (not shown). The housing 12 may alternatively be formed as a portion of the vehicle instrument panel or other part of the vehicle in which the module 10 is mounted.

The housing 12 has a box-shaped configuration including parallel side walls 14 and 16 and parallel end walls 18 and 20. A bottom wall 22 of the housing 12 extends between and interconnects the side walls 14 and 16 and the end walls 18 and 20. The walls 14–22 of the housing define a chamber 24 in the housing 12. The side walls 14–20 have edge portions which define an inflation fluid outlet 26 for directing inflation fluid to flow out of the chamber 24 in the housing. The inflation fluid outlet 26 is located opposite the bottom wall 22 of the housing 12.

A pair of aspiration openings 30 and 32 are formed in the side walls 14 and 16, respectively, of the housing 12. Each one of the aspiration openings 30 and 32 has a generally oval configuration. The aspiration openings 30 and 32 are located near the end wall 18 and the bottom wall 22 of the housing 12. The aspiration openings 30 and 32 open the chamber 24 to ambient atmospheric pressure.

An inflatable vehicle occupant protection device in the form of an air bag 40 is connected with the housing 12 in a manner to be inflatable by inflation fluid flowing through the outlet 26. A cover indicated schematically at 42 normally covers and protects the air bag 40 when the air bag is in the uninflated condition. it should be understood that other inflatable vehicle occupant protection devices can be used in accordance with the invention including, for example, inflatable seat belts, inflatable knee bolsters, inflatable head liners or side curtains, and knee bolsters operated by inflatable air bags.

An inflation fluid container or bottle 50 is located in the chamber 24 in the housing 12. A pair of straps (not shown) secure the bottle 50 in the housing 12. The bottle 50 contains a quantity of a compressible fluid under pressure, preferably helium gas, for inflating the air bag. The helium, indicated at 52, is preferably stored in the bottle at about 6,250 psi ±100 psi.

The bottle 50 has an outlet indicated generally at 56 through which inflation fluid can exit the bottle when an attached opener (indicated schematically at 58) is actuated. The opener 58 is an electrically operable device for releasing inflation fluid to flow from the bottle 50. The opener 58 can be a valve or an assembly including a rupturable burst disk, for example.

An end cap 60 is connected with the bottle 50. The end cap 60 receives inflation fluid from the outlet 56 of the bottle 50 and directs the inflation fluid to flow into a nozzle 70. The nozzle 70 is located on the bottom wall 22 of the housing 12, that is, opposite the inflation fluid outlet 26 of the housing.

The nozzle 70 is a converging-diverging nozzle which has an inlet portion or inlet 72 in fluid communication with the end cap 60 and an outlet or gas exit opening 74 which opens into the chamber 24 in the housing 12. Between the inlet 72 and the outlet 74, the nozzle has a converging portion 76, a throat 78, and a diverging portion 80.

Figure 2:
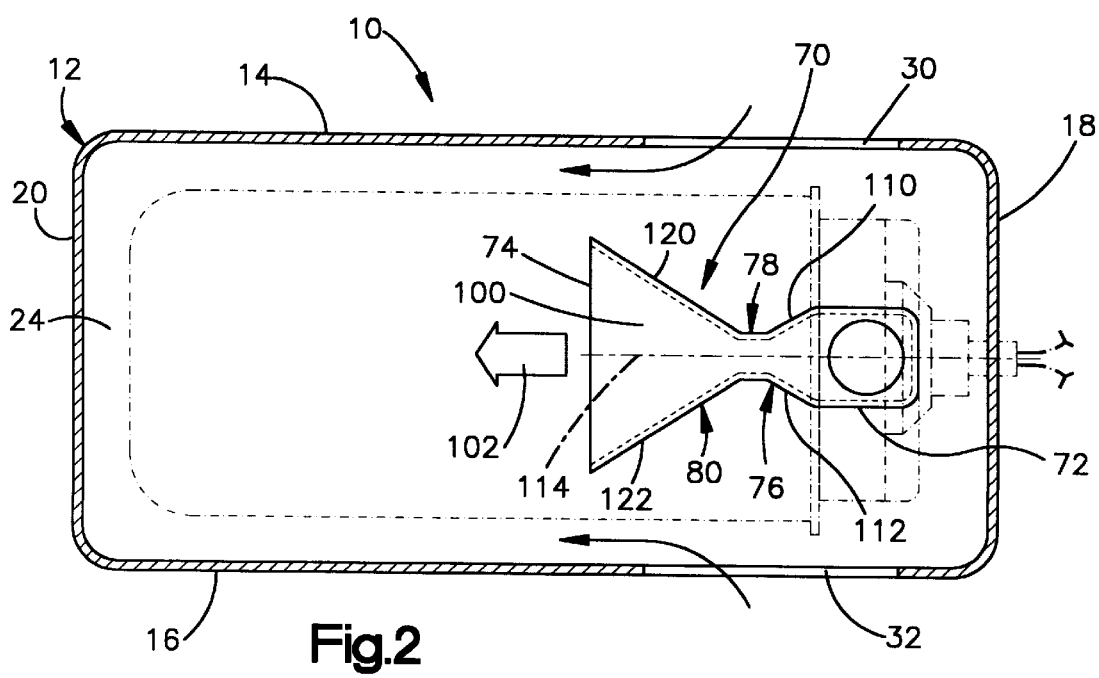
FIG. 2 is a schematic top plan view of the air bag module of FIG. 1.
Figure 3:
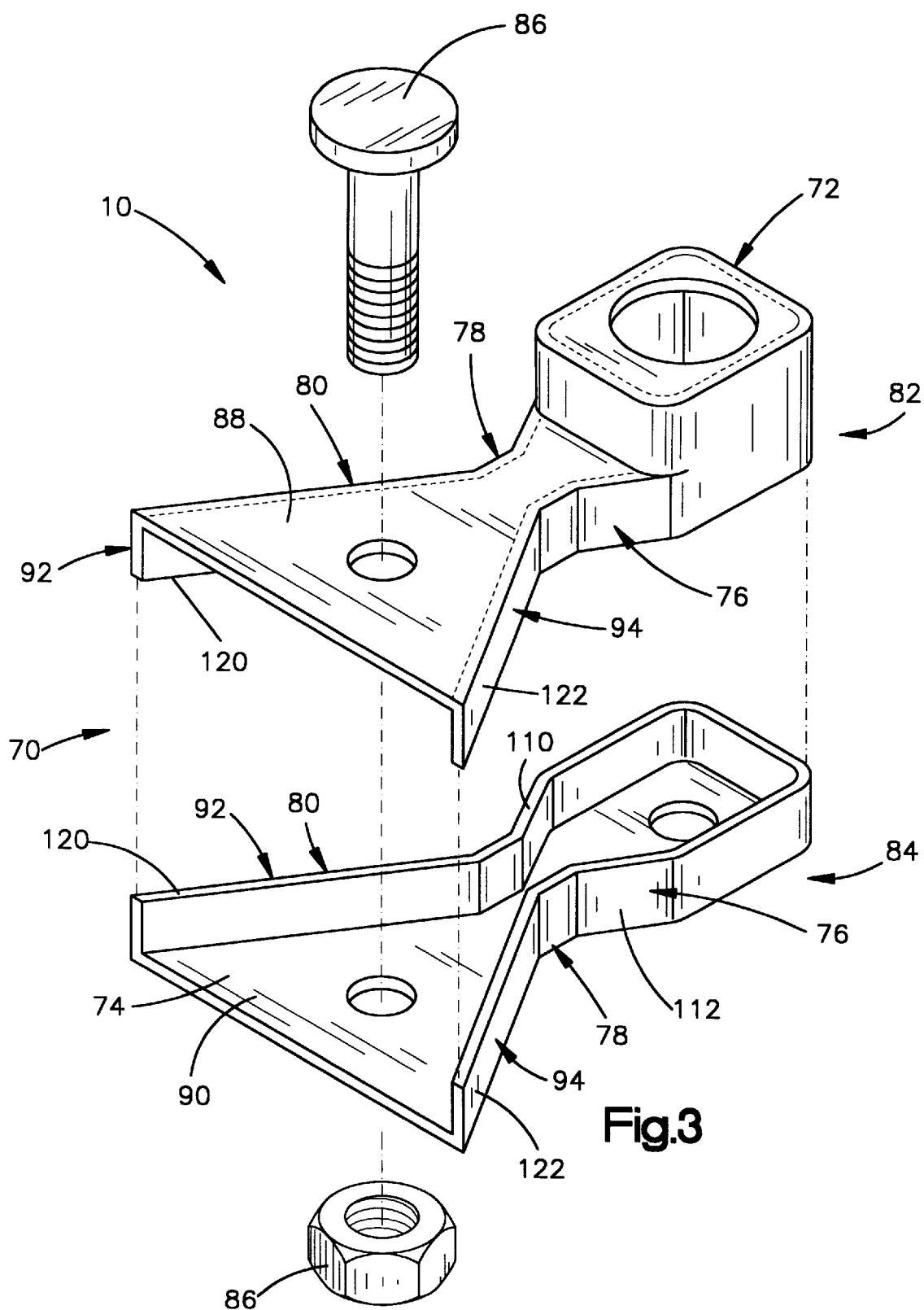
FIG. 3 is an enlarged exploded perspective view of a nozzle which forms a part of the air bag inflator assembly of FIG. 1.
Figure 4:
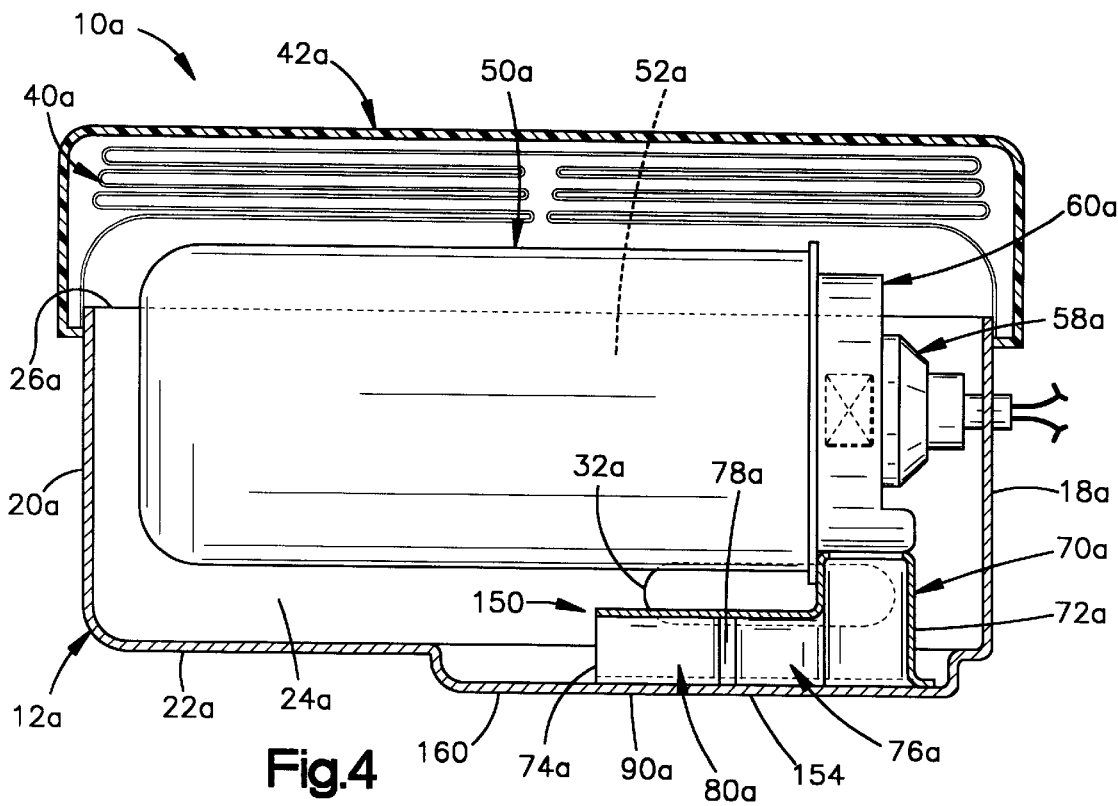
FIG. 4 is an enlarged view of a portion of an air bag module including an air bag inflator assembly in accordance with a second embodiment of the present invention.

The nozzle 70, illustrated in FIGS. 1–3, is made from two nozzle pieces 82 and 84 which are fastened to each other and to the bottom wall 22 of the housing 12 by a pair of fasteners 86, such as bolts and nuts. The nozzle 70 has planar inner and outer walls 88 and 90 which extend for the entire length of the converging-diverging portions of the nozzle. The inner wall 88 is disposed adjacent to the bottle 50. The outer wall 90 is disposed adjacent to and extends along the bottom wall 22 of the housing 12.

The nozzle 70 also has two side walls 92 and 94 which extend for the length of the converging-diverging portions of the nozzle. The side walls 92 and 94 and the inner and outer walls 88 and 90 together define a fluid flow path or passage 100 in the nozzle. Upon opening of the bottle 50, as described below, helium 52 from the bottle flows through the passage 100 in the nozzle 70 in the downstream direction indicated by the arrow 102, that is, from the inlet 72 to the outlet 74 of the nozzle.

The converging portion 76 of the nozzle extends between the inlet 72 and the throat 78. The converging portion 76 of the nozzle 70 includes converging portions 110 and 112 of the nozzle side walls 92 and 94, respectively. The wall portions 110 and 112, as they extend in the downstream direction 102 from the inlet 72 to the throat 78, converge on each other at an angle of about 30 degrees to a longitudinal central axis 114 of the nozzle 70. The cross-sectional area of the converging portion 76 of the nozzle 70 at the inlet 72 is, therefore, greater than the cross-sectional area of the converging portion at its downstream end, that is, at the entrance to the throat 78.

The throat 78 of the nozzle 70 extends between and interconnects the downstream end of the converging portion 76 of the nozzle and the upstream end of the diverging portion 80 of the nozzle. The throat 78 has a constant cross-sectional area for its entire length.

The diverging portion 80 of the nozzle 70 extends between the throat 78 and the outlet 74 of the nozzle. The diverging portion 80 of the nozzle 70 includes diverging portions 120 and 122 of the nozzle side walls 92 and 94, respectively. The wall portions 120 and 122 diverge from each other as they extend in the downstream direction 102 from the throat 78 to the nozzle outlet 74. In the illustrated embodiment, the wall portions 120 and 122 extend at the same 30 degree angle relative to the axis 114 as the side walls 110 and 112 of the converging portion 76. The cross-sectional area of the diverging portion 80 of the nozzle 70 at the throat 78 is, therefore, less than the cross-sectional area of the diverging portion at the outlet 74. Also, in the illustrated embodiment, the diverging portion 80 of the nozzle 70 is substantially longer than the converging portion 76 of the nozzle, specifically, about 2.5 times as long.

In the event of a collision or other event for which inflation of the air bag 40 is desired to help protect a vehicle occupant, the opener 58 is actuated and helium 52 flows out of the bottle 50. The pressurized helium 52 exits the bottle 50 and flows through the end cap 60 into the inlet portion 72 of the nozzle 70. The helium 52 then flows into the converging portion 76 of the nozzle 70.

The helium 52, which was compressed greatly in the bottle 50, begins to decompress (expand) immediately when it leaves the bottle. The pressure in the stream of flowing helium 52, as measured at successive points downstream of the bottle 50 through the end cap 60 and the converging portion 76 of the nozzle 70, is decreasing. The pressure decreases because the helium 52 is flowing to an area (the chamber 24) which is at atmospheric pressure of 14.7 psig. As the pressure of the helium 52 decreases, its density decreases, because helium is a compressible fluid and for compressible fluids density is proportional to pressure.

The speed of the helium 52 increases as it flows from the end cap 60 into and through the converging portion 76 of the nozzle 70. This is because of the relationship of pressure, density, and speed in a compressible fluid. Specifically, the mass flow rate remains constant for any given portion of the helium gas 52 as it flows through the nozzle 70. The mass flow rate is governed by the equation:

Mass flow rate=Density*Area*Velocity=Constant

Since the pressure and density of the helium 52 flowing through the converging portion 76 of the nozzle 70 are decreasing, and since the cross-sectional area of the converging portion of the nozzle is also decreasing in the downstream direction, the velocity of the helium must necessarily increase in the converging portion of the nozzle to maintain the mass flow rate.

The overall mass flow rate of the helium 52 discharging from the bottle 50 decreases over time. The initial mass flow rate when the bottle 50 is first opened is based on the differential pressure between the stored gas 52 in the bottle and the atmosphere. As the pressure differential between the stored helium 52 in the bottle 50 and the atmosphere approaches zero, the mass flow rate also decreases to zero.

The velocity of the helium gas 52 increases from a velocity of zero in the bottle 50 to a velocity of less than Mach 1 (the speed of sound) at the nozzle inlet 72. The velocity of the helium 52 increases further as it flows through the converging portion 76 of the nozzle 70. In the illustrated embodiment, the helium 52 increases to a velocity of Mach 1 at the entrance to the throat 78.

The velocity of the flowing helium 52 remains constant over the length of the throat 78, because the pressure, density, and cross-sectional area remain constant. As the helium 52 exits the throat 78 and flows through the diverging portion 80 of the nozzle 70, the helium continues to expand (decrease in pressure and density) until it reaches atmospheric pressure of 14.7 psig. The decrease in pressure and density exceeds the increase in cross-sectional flow area of the diverging portion 80 of the nozzle 70, so the velocity of the helium 52 increases in the diverging portion of the nozzle. The gas flow 80 in the diverging portion of the nozzle 70 is supersonic, that is, at a velocity greater than Mach 1. In one embodiment constructed in accordance with the invention, the velocity of the helium 52 exiting the diverging portion 80 of the nozzle 70 is approximately Mach 3.

When the helium 52 leaves the nozzle 70, its velocity is so high that a large amount of ambient air in the chamber 24 of the housing 12 is drawn into and entrained in the flowing helium. The mixture of helium and air is directed out of the housing 12 through the inflation fluid outlet 26 into the air bag 40 to inflate the air bag. As this occurs, ambient air flows into the housing 12 through the aspiration openings 30 and 32. The aspiration openings 30 and 32 are located upstream of the nozzle outlet 74, so that air drawn into the housing 12 flows in the direction 102 of the helium 52 flowing in the nozzle 70. The amount of ambient air which is aspirated into the housing 12 to mix with the helium 52 is directly proportional to the mass and velocity of the flowing helium. A typical converging-diverging nozzle configuration can provide a ratio of about 50 parts air to 100 parts helium (by mole weight).

The temperature of the helium 52 is about 100 degrees Kelvin, while the temperature of the ambient air is about 300 degrees Kelvin. The air thus heats the helium 52 when they mix, making the resulting inflation fluid warmer than helium alone. The warmer inflation fluid has more energy for inflation of the air bag 40. In addition, the mixture of helium and air has more mass than the helium alone. This increase in mass of the inflation fluid also helps to inflate the air bag. For these two reasons, less energy has to be provided by the stored helium 52. As a result, the bottle 50 can be smaller, and can contain less helium 52.

The speed increase provided by the converging-diverging nozzle 70, and the consequent aspiration of a large amount of ambient air, thus makes the use of helium practical as an inflation fluid component even though it is very low in molecular weight. Argon, for example, has a relatively high molecular weight (about 70 times that of helium) and can be used alone as an inflation fluid. The converging-diverging nozzle enables helium to be directed toward the air bag 40 at a speed great enough to aspirate sufficient ambient air to inflate the air bag properly.

The size and location of the aspiration openings 30 and 32 can be varied to control the amount of air drawn into the housing 12 during inflation of the air bag 40. In addition, the aspiration openings 30 and 32 become exhaust vents for the module 10 under certain circumstances. For example, an "out of position" occupant who is close to the module 10 upon actuation, will load the air bag 40 at an early stage in the deployment of the air bag. The engagement of the occupant with the air bag 40 will increase the pressure in the air bag sufficiently to apply back pressure to the module 10. The increased pressure in the housing 12 can be vented through the aspiration openings.

If the helium 52 in the bottle 50 is at 6250 psi, there is about a 1500 to 2000 psi pressure drop to the nozzle inlet 72. The remaining pressure drop, to atmospheric pressure, occurs in the converging and diverging portions 76 and 80, respectively, of the nozzle 70. More than 50% of this remaining pressure drop occurs in the diverging portion 80 of the nozzle 70. Thus, there is a very large pressure drop (2000 psi or more) in the diverging portion 80 of the nozzle 70, and a consequently great increase in velocity, to supersonic speeds.

Figure 5:
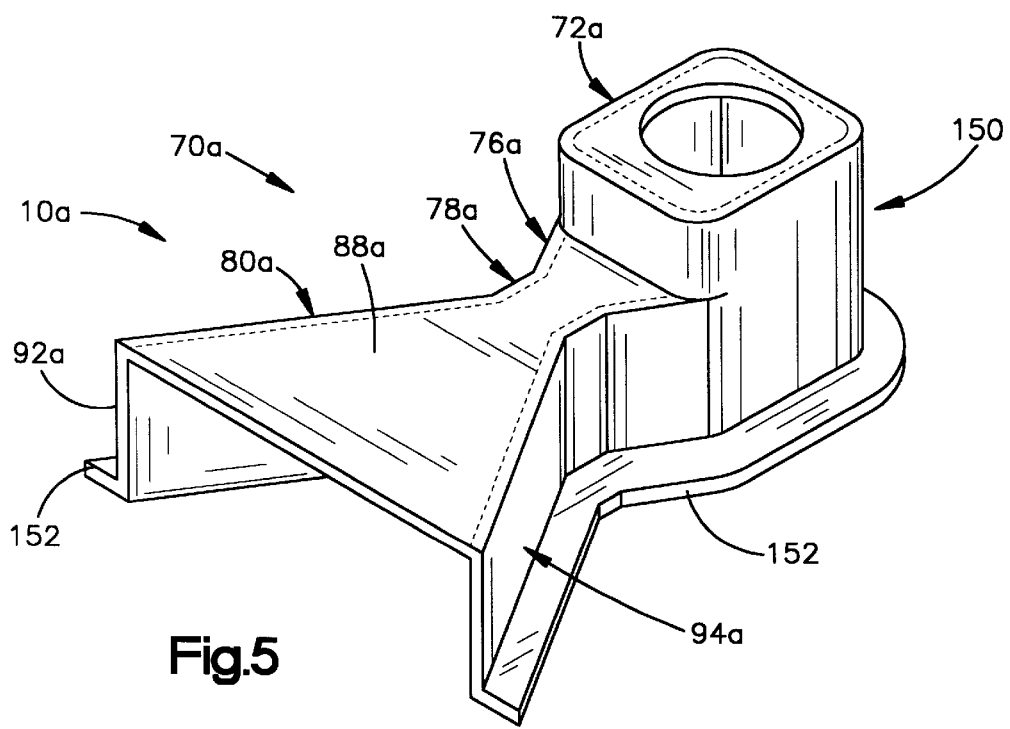
FIG. 5 is an enlarged perspective view of a nozzle piece which is included in the air bag inflator assembly of FIG. 4.

FIGS. 5 and 6 illustrate an air bag module 10a in accordance with a second embodiment of the present invention. The air bag module 10a is similar in construction to the air bag module 10 (FIGS. 1–4) and similar parts are given the same reference numerals with the suffix "a" added for clarity.

The air bag module 10a includes a converging-diverging nozzle 70a. The nozzle 70a comprises a nozzle piece 150. The nozzle piece 150 includes an inner wall 88a of the nozzle 70a and two side walls 92a and 94a of the nozzle. The nozzle piece 150 includes an inlet portion 72a of the nozzle.

The nozzle piece 150 has an outer peripheral flange 152 which projects from the side walls 92a and 94a and the inlet 72a of the nozzle along the outer perimeter of the nozzle piece. The flange 152 of the nozzle piece 150 is welded to the bottom wall 22a of the housing 12a. The flange 152 encloses a portion 154 of the bottom wall 22a of the housing 12a, which wall portion forms the outer wall 90a of the nozzle 70a.

The bottom wall 22a of the housing 12a has a recessed portion 160 to which the nozzle piece 150 is welded. The recessed portion 160 of the bottom wall 22a is configured in a manner not visible in FIGS. 4 and 5 to provide for mistake-proof mounting of the nozzle piece 150 on the housing 12a. The operation of the module 10a, including the nozzle 70a, is similar to the operation of the module 10 including the nozzle 70.

From the above description of the invention, those skilled in the art will perceive improvements, changes and modifications in the invention. Such improvements, changes and modifications within the skill of the art are intended to be covered by the appended claims.

What is claimed is:

1. Apparatus for inflating an inflatable vehicle occupant protection device, said apparatus comprising:

a housing;

a container in said housing;

a quantity of gas stored under pressure in said container; and means for opening said container to enable flow of gas out of said container into said housing;

said housing having wall portions to direct gas flowing from said container through an outlet of said housing into the inflatable device to inflate the inflatable device;

said housing having at least one aspiration opening through which ambient air is aspirated into said housing due to the flow of said gas to mix with said gas during flow of said gas from said container into the inflatable device; and a converging-diverging nozzle in fluid communication with said container to direct flow of said gas from said container through said nozzle prior to mixing with ambient air in said housing, said converging-diverging nozzle being located in said housing.

2. An apparatus as set forth in claim 1 wherein said gas is helium gas and said converging-diverging nozzle has an outlet to direct said helium gas into said housing, said at least one aspiration opening being located upstream of said outlet of said converging-diverging nozzle.

3. An apparatus as set forth in claim 2 wherein said helium is stored in said container at about 6250 psig.

4. An apparatus as set forth in claim 1 wherein said housing includes two side walls between which said container and said converging-diverging nozzle are located, said housing including at least one aspiration opening in each one of said side walls.

5. An apparatus as set forth in claim 1 wherein said gas is helium gas.

6. An apparatus as set forth in claim 1 wherein said converging-diverging nozzle has a nozzle inlet for receiving gas flowing from said container and a nozzle outlet to direct gas from said container into a chamber in said housing, said chamber containing air at atmospheric pressure, said nozzle accelerating said gas to a velocity above the speed of sound when said gas leaves said nozzle through said nozzle outlet to aspirate ambient air into said housing.

7. An apparatus as set forth in claim 1 wherein said converging-diverging nozzle has an inlet to receive gas flowing from said container and an outlet for directing gas from said container into a chamber in said housing, said at least one aspiration opening being located upstream of said nozzle outlet.

8. An apparatus as set forth in claim 1 wherein said nozzle comprises a part separate from said housing, and further including means for fastening said nozzle to a wall of said housing.

9. An apparatus as set forth in claim 1 wherein a portion of said nozzle comprises a wall portion of said housing.

10. An apparatus as set forth in claim 9 wherein said gas comprises helium.

11. An apparatus as set forth in claim 1 wherein said nozzle has a converging portion for receiving gas from said container, a throat having a constant cross-sectional area in fluid communication with said converging portion, and a diverging section in fluid communication with said throat to direct gas from said nozzle into said housing, said nozzle comprising means for increasing the speed of said gas flowing from said container to a speed of about the speed of sound at the entrance to said throat portion of said nozzle.

12. An apparatus as set forth in claim 11 wherein said nozzle comprises a means for causing the speed of said gas flowing through said diverging portion of the nozzle to become supersonic.

13. An apparatus as set forth in claim 12 wherein said nozzle further comprises a means for providing said gas with an exit speed from the diverging portion of the nozzle of approximately Mach three.

14. An apparatus as set forth in claim 13 wherein said nozzle comprises a means for providing an aspiration ratio of about 50 parts of air to 100 parts of gas.

* * * * *